United States Patent Office 3,202,619
Patented Aug. 24, 1965

3,202,619
GRAPHITIC NEUTRON REFLECTOR CONTAINING BERYLLIUM AND METHOD OF MAKING SAME
Robert Le Baron, Washington, D.C., assignor to Great Lakes Carbon Corporation, New York, N.Y., a corporation of Delaware
No Drawing. Filed Apr. 2, 1962, Ser. No. 184,516
17 Claims. (Cl. 252—478)

This invention relates to the production of carbon or graphite bodies containing beryllium or beryllium compounds which are suitable for use as neutron reflectors in atomic reactor cores. More particularly, this invention relates to carbon or graphite bodies having a beryllium compound such as beryllium carbide uniformly dispersed in the carbon or graphite and to processes for making these bodies.

Beryllium metal has been used alone as a reflector for neutrons in atomic reactors but this suffers from the disadvantage of the high cost of beryllium metal. Also, because of the relatively low melting point of beryllium (about 1280° C.), the use of beryllium metal reflectors is restricted to low temperature reactors.

It is a primary object of this invention to obtain the greatest possible uniformity of dispersion of beryllium in reactor grade carbon and graphite articles.

It is a further object of this invention to produce a novel type of neutron reflector by incorporating beryllium metal, or beryllium in the form of a beryllium compound, into purified calcined petroleum coke or binder pitch which is originally made sufficiently pure for reactor purposes or into mixtures of such purified calcined carbonaceous materials and binder pitches.

It is another object of this invention to produce a novel type of neutron reflector by incorporating beryllium metal or beryllium in the form of a beryllium compound into purified graphite aggregate particles or flour which is originally made sufficiently pure for reactor purposes, or into mixtures of such purified carbonaceous materials and purified binder pitches.

It is a further object of this invention to produce a novel type of neutron reflector by incorporating beryllium metal or beryllium in the form of a beryllium compound into purified raw uncalcined petroleum coke or binder pitch which is originally made sufficiently pure for reactor purposes or into mixtures of such purified carbonaceous materials and binder pitches.

In a broad embodiment, beryllium metal or a beryllium compound, for example, beryllium oxide, carbide, nitrate, etc., is uniformly dispersed or distributed through certain raw materials used in the manufacture of reactor grade carbon or graphite. The amount of beryllium (expressed as metal) employed may be varied upwardly from a few tenths of one percent to approximately slightly less than fifty percent of the final graphite or carbon matrix; the amount selected or employed being dependent upon a number of factors such as cost, strength and other characteristics of body required, temperatures to be encountered, etc.

This broad objective may be achieved by a number of novel processes. For example, purified carbon aggregate particles or flour, such as calcined petroleum coke flour or graphite flour, are impregnated with a solution of a beryllium compound, such as an aqueous solution of beryllium nitrate, followed by evaporation leaving the beryllium compound dispersed in the particles or flour. This material is used with a binder such as tar or pitch which is free of impurities harmful or detrimental to reactor processes, and which may or may not contain beryllium compounds. This mix is then pressed or formed into a compact body, and baked and optionally also graphitized by methods conventional to the manufacture of carbon or graphite electrodes; thereby yielding predominantly carbon or graphitic bodies suitable for use as neutron reflector materials in atomic reactors in which bodies at least a few tenths of 1% of beryllium or of a beryllium compound (typically beryllium carbide) is uniformly dispersed.

It should be stated that this invention is intended to cover beryllium containing carbon or graphite bodies, no matter what the form of the beryllium material. It may be in the form of beryllium metal. Or it may be in the form of a beryllium compound. Or it may be in a transitional form such as from the metal to the carbide, or from the nitrate to the oxide and thence to the carbide, etc.

If the oxide or nitrate is employed in the initial mixture, it should be used in relatively small amounts if the prepared mixtures are to be graphitized, because at elevated temperatures the oxygen contained in these compounds will react with the carbon in the mixtures and liberate carbon monoxide. The liberation of excessive amounts of carbon monoxide means that a significant quantity of the carbon in the formed body will disappear and thus impair it structurally. However this attack will not occur at any great rate at temperatures below that at which beryllium oxide reacts with the carbon (around 1,900° C.) and therefore if the bodies being produced are to be heated only to temperatures below this, in their production or in their use, then this restriction does not apply, and high percentages of the oxide or of the nitrate of beryllium may be employed in the initial mixture.

If the beryllium metal is employed, it will react with the carbon at elevated temperatures (around 1,300° C.) but this will not be accompanied by any gas evolution and the structural characteristics of the formed body will therefore remain substantially constant.

If the beryllium carbide ($Be_2C$) is employed, it will remain substantially constant during the heat treatment operations.

In all cases the final products will be made from mixtures of a carbonaceous material, which may be bonded autogenously or by the addition of a carbonizable binder, and beryllium metal or a beryllium compound.

The percentage of beryllium in the final product is based strictly on the amount of beryllium present. For example, if a mixture contains 60 parts of beryllium carbide, then it contains only 36 parts of beryllium, the other 24 parts being carbon in the carbide. Also for purposes of this invention this 24 parts of combined carbon in the carbide is interpreted as carbon, as would be the case if an ultimate analysis for C and for Be were carried out on the final body.

There are several advantages to using these beryllium containing carbon or graphite bodies as neutron reflectors in reactor cores. The cost of a carbon or graphite body containing 5% beryllium would be nominal in comparison to the cost of a reflector made solely or substantially solely of beryllium metal. These new materials also make it practical to employ beryllium at elevated temperatures in order to reflect neutrons, where if beryllium alone were used, it would not be satisfactory. The ease with which the bodies are made is an additional advantage.

The beryllium or the compound of same may be incorporated into calcined coke particles which are originally made sufficiently pure for reactor purposes or into a mixture of purified calcined coke particles and pitch which is free from impurities harmful or detrimental to reactor processes. Or purified graphite particles or flour may be used in the place of the calcined coke. Suitable methods for purifying reactor grade carbon or graphite raw materials are by high temperature chlorination (2,500° C.), by use of chlorinated hydrocarbons such as carbon tetrachloride at elevated temperatures, and the use of Freon gas (dichlorodifluoromethane) and the like.

In another embodiment of the invention, a carbon aggregate, either calcined petrolum coke particles or graphite particles, is bonded with a carbonaceous binder such as coal tar pitch base or a carbonaceous resin based binder in which a beryllium compound has been colloidally dispersed (in a colloid mill) in concentrations compatible with the end use. This mix is then further processed to a suitable carbon or graphite matrix or article by methods conventional to manufacture of carbon and graphite electrodes. If desired, a finely divided carbon such as Thermax may also be added to the binder or to the calcined coke particles or graphite particles. Thermax is a trademark of the R. T. Vanderbilt Company for a soft, finely-divided carbon obtained by thermal decomposition, or cracking, of natural gas. The mixing may be performed continuously or batchwise.

In still other embodiments of the invention, beryllium compound impregnated graphite particles or calcined petroleum coke particles may also be bonded with a binder such as coal tar pitch base or resin base binder in which beryllium or a beryllium compound has been colloidially dispersed in concentrations compatible with the end use. These mixes are then further processed to suitable carbon or graphite articles by methods conventional to manufacture of graphite electrodes.

The beryllium may also be incorporated into a raw petroleum coke which is originally made sufficiently pure for reactor purposes.

In one specific embodiment the invention comprises impregnating purified calcined coke flour (50–60% —200 Tyler mesh) with a beryllium solution such as beryllium nitrate in water and evaporating the solution leaving a residue of a berryllium compound dispersed throughout the particles of the flour. This flour is then utilized, together with a suitable carbonaceous binder, to make the formed and heat treated bodies, which may be of any desired shape and size.

In another specific embodiment the invention comprises impregnating purified graphite flour, i.e., 50–60% —200 Tyler mesh, with a beryllium solution such as beryllium nitrate in water and then continuing the processing in the same manner as when employing calcined coke flour.

In still another specific embodiment, the invention comprises adding a high boiling hydrocarbon plasticizing agent, such as creosote oil, to ground raw petroleum coke and plasticizing the coke by intensive mixing at either room temperature or elevated temperatures, and incorporating beryllium by means of the intensive mixer. This mixture is then either cold or hot pressed at a few thousand pounds per square inch to any desired shape or form, followed by baking and graphitization by known techniques. The article may also be pitch-impregnated to raise the apparent density from about 1.50 to about 1.75 grams per cubic centimeter and higher, depending upon the number of impregnations employed. Other suitable plasticizers are heavy distillates such as anthracene oil from coal tar and high boiling fractions from oil gas or water gas tars.

Baking may be performed in either batch furnaces or continuously depending upon the size and shape of the fabricated article. Graphitization, when practiced, is also performed either batchwise or continuously and typically to a sufficiently high temperature to reduce the hydrogen content to desired levels and simultaneously reach the maximum structural strength of the final product. The temperatures employed in either of these steps will be consistent with the nature of the properties desired in the final products, their intended use, and the materials contained in same, all in a manner which will be apparent to one skilled in the art. The decomposition temperature (around 2,100° C.) of beryllium carbide also restricts the temperatures to which the formed mixtures are heated.

It will of course be appreciated that if the original mixture is largely made up of graphite particles, then the final body will be graphitic in nature even after merely heat treating same to baking temperatures, or temperatures sufficiently high to carbonize the binder. In some cases, therefore, it may be unnecessary to proceed beyond or above baking temperatures when employing this type of particles, and disadvantageous to do so because of the additional processing involved. Of course the maximum processing temperatures employed should at least equal ox exceed the maximum temperature expected during the use of the articles. When employing mixtures made up largely of raw petroleum coke or calcined petroleum coke however, this will not be the case, and in order to obtain graphitic or graphite-like bodies, elevated temperatures up to about 2,000° C. will generally be employed to make bodies having preferred properties. However, in many cases, even when employing these types of particles, particularly when employing calcined petroleum coke particles, useful heat treated bodies will be obtained without subjecting the formed bodies to temperatures so high as graphitizing temperatures, and therefore one may not wish to carry out a graphitizing step. The invention is meant, therefore, to cover these possibilities also.

The final products, in any of these embodiments, are "essentially" carbon or graphitic in nature depending upon the time and temperature of the heat treatment. By the term "essentially" is meant to connote that the body has a carbon or graphitic matrix which gives foundation to the beryllium metal or beryllium compound enclosed or embedded in it. It is also meant to connote that the body is predominantly carbon or predominantly graphite; that the beryllium contained in said body is never present in more than a minor percentage; that usually nothing else is present in the product except the carbonaceous bond of binder coke which develops during the baking or during the baking and graphitizing steps; and that if anything else is present in the final product it is there in only very small or trace quantities which do not materially alter the essential nature of the product as hereinbefore defined.

Many carbonizable substances are suitable for the bonding function. Conventional coal tar pitches which have been properly purified are typical. Properly purified binding materials such as set forth on pages 225–229 in the book "Industrial Carbon" by Mantell, second edition, 1946, may also be used. Alternately, resinous binders such as thermosetting phenol-formaldehyde, phenol-benzaldehyde, furfural, and epoxy resins may be employed. The coking values of these binders vary as do also their viscosities and melting points, etc. However they are all characterized by the fact that they decompose upon heating, or undergo thermal decomposition, leaving carbon bonds which hold together the finely ground particles of the body materials. Where raw petroleum coke particles are employed as the starting materials, no such extraneous binder materials are required (although such binder materials may of course be used) because the development of carbonaceous bonds can occur autogenously due to the volatile matter contained in the raw petroleum coke. In any case, because of the very thorough mixing of the raw materials, the accompanying forming and heat treating steps, and the distillation-cracking action by which the binder or inherent volatile matter is converted into coke, the whole mass of the heat treated article is held together very strongly and each small particle that had been covered by a film of binder is bound to the adjacent particles by a thin layer of coke, or, in the case of raw petroleum coke, each small particle develops an autogenous carbonaceous bond with adjacent particles. The type of bonding being described here is also discussed in detail at page 249 of the Mantell volume cited above.

Where an extraneous binder is necessary, the amount employed will vary depending upon its coke yield, the size of the particles which make up the mix, the thoroughness of the mixing operation and the strength desired or necessary in the final baked or graphitized products. In general about 15 parts of pitch for 115 parts of a mixture is about a minimum which might be employed, while about 30–35 parts of pitch would be typical. More carbonizable binder than this may, of course, be employed.

As a result of the foregoing thorough mixing of the starting particles and the forming and heat treatment thereof, the beryllium or the beryllium compound is bonded into the final baked or baked and graphitized article by a lattice of carbon and is also very uniformly dispersed in said article. It is not merely contained in pores of a pre-formed and heat treated article, as would be the case if conventional impregnation practices were followed; nor is the final structure the result of a metallurgical technique such as sintering, where bonding results from a combination of heat and pressure rather than from thermal cracking, etc., such as described above.

The following examples further illustrate the invention.

*Example 1*

One hundred parts by weight of calcined petroleum coke flour (55%—200 mesh) were charged to a preheated mix-muller and heated for about 20 minutes at 160° C. Fifteen parts by weight of pitch binder were mixed with 24 parts by weight of a mixture consisting of beryllium oxide and pitch. The resulting beryllium oxide-pitch composition was crushed to about —4 mesh and added to the flour in the mix-muller and the mixing was continued for 15 minutes at 160° C. The mix was cooled to room temperature, crushed, and passed through a micro-pulverizer. The pulverized material was cold-pressed in a 5 inch diameter mold at room temperature and 5,000 p.s.i. The resulting piece was heated in an oven for 18 hours at 110° C. Then the material was recharged to the mold which had been heated to 112° C. and hot-pressed at 1,500 p.s.i. The piece was then baked for 9 days to a final temperature of about 1,000° C., following normal or conventional electrode baking practices.

*Example 2*

Example 1 was repeated but the baking step was followed by graphitization over a period of 48 hours to a final temperature of about 2,000° C., following normal or conventional electrode graphitizing practices.

*Example 3*

Twenty-five parts by weight of Thermex and 75 parts by weight of calcined petroleum coke flour were mixed and charged to a preheated mix-muller and heated at 160° C. for about 20 minutes. Eight parts by weight of pitch binder were mixed with 23 parts by weight of a mixture consisting of beryllium oxide and pitch. The resulting beryllium oxide-pitch composition was crushed to about —4 mesh and mixed at room temperature. The pitch-beryllium oxide mixture was added to the mix-muller and the mixing was continued for 15 minutes at 160° C. The mix was then cooled to room temperature, crushed, and passed through a micro-pulverizer. The pulverized material was cold-pressed in a 5 inch diameter mold at room temperature and 5,000 p.s.i. The resulting piece was heated in an oven for 18 hours at 110° C. and then recharged to the mold which had been heated to 114° C. and hot-pressed at 1,500 p.s.i. The piece was baked for 9 days to a final temperature of 1,000° C.

*Example 4*

Example 3 was repeated but the baking step was followed by graphitization to a final temperature of about 2,000° C., following normal or conventional electrode graphitizing practices.

*Example 5*

Five hundred (500) grams of raw petroleum coke (62%—200 Tyler mesh) having volatile matter content of 14.1% and 5% by weight of beryllium oxide were mix-mulled for 10 minutes at 100° C.; then 11% by weight of anthracene oil was added, and the coke, oil, and beryllium oxide were mixed for an additional 15 minutes at 100° C. The mix was cooled to room temperature and milled to break up the agglomerates. The material was pressed at 25° C. in a 5 inch diameter mold to 3,900 p.s.i. The resulting piece was baked at a rate of 10° C. per hour to a final temperature of 600° C. followed by graphitization to 2,000° C., using a 10° C. per minute rate to 1,000° C. followed by a 3.5° C. per minute rate to 2,000° C.

*Example 6*

Forty-seven (47) parts by weight of graphite flour were charged to a pre-heated mix-muller and heated for about 20 minutes at 160° C. Thirty parts by weight of pitch binder were mixed with 53 parts of beryllium metal powder. This mixture was crushed to about —4 mesh and added the graphite flour in the mix-muller and the mixing was continued for 15 minutes at about 160° C. The mix was cooled to room temperature, crushed, and passed through a micro-pulverizer. The pulverized material was cold-pressed in a 5 inch diameter mold at room temperature and 5,000 p.s.i. The resulting piece was heated in an oven for 18 hours at 110° C. Then the material was re-charged to the mold, which had been heated to 112° C., and hot pressed at 1,500 p.s.i. The piece was then baked for 9 days to a temperature of about 1,000° C., following normal or conventional baking practices.

*Example 7*

Example 6 was repeated but the baking step was followed by graphitizing over a period of 48 hours to a final temperature of about 2,000 C., following normal or conventional electrode graphitizing practices.

The percentages of beryllium metal and of total carbon in the final products of Examples 6 or 7 were about 44.9% and about 55.1% respectively.

*Example 8*

Sixty (60) parts by weight of graphite flour were charged to a pre-heated mix-muller and heated for about 20 minutes at 160° C. Thirty (30) parts by weight of pitch binder were mixed with 40 parts of beryllium metal powder. This mixture was crushed to about —4 mesh and added to the graphite flour in the mix-muller and the mixing was continued for 15 minutes at about 160° C. The mix was cooled to room temperature, crushed, and passed through a micro-pulverizer. The pulverized material was cold pressed in a 5 inch diameter mold at room temperature and 5,000 p.s.i. The resulting piece was heated in an oven for 18 hours at 110° C. Then the material was re-charged at the mold, which had been heated to 112° C., and hot pressed at 1,500 p.s.i. The piece was then baked for 9 days to a temperature of about 1,000° C., following normal or conventional baking practices.

*Example 9*

Example 8 was repeated but the baking step was followed by graphitizing over a period of 48 hours to a final temperature of 2,000° C., following normal or conventional electrode graphitizing practices.

The percentages of beryllium metal and of total carbon in the final products of Examples 8 or 9 were about 33.6% and 66.4%, respectively.

*Example 10*

Sixty (60) parts by weight of graphite flour were charged to a pre-heated mix-muller and heated for about 20 minutes at 160° C. Thirty (30) parts by weight of powered pitch binder were mixed with 40 parts of beryllium carbide powder and added to the graphite flour in the mix-muller and the mixing was continued for 15 minutes at about 160° C. The mix was cooled to room temperature, crushed, and passed through a micro-pulverizer. The pulverized material was cold-pressed in a 5 inch diameter mold at room temperature and 5,000 p.s.i. The resulting piece was heated in an oven for 18 hours at 110° C. Then the material was re-charged to the mold, which had been heated to 112° C., and hot pressed at 1,500 p.s.i. The piece was then baked for 9 days to a temperature of about 1,000° C., following normal or conventional baking practices.

*Example 11*

Example 10 was repeated but the baking step was followed by graphitizing over a period of 48 hours to a final temperature of 2,000° C., following normal or conventional electrode graphitizing practices.

The percentage of beryllium metal and of total carbon in the final products of Examples 10 or 11 was about 20.2% and 79.8% respectively.

*Example 12*

Fifty (50) parts by weight of graphite flour were charged to a pre-heated mix-muller and heated for about 20 minutes at 160° C. Thirty (30) parts by weight of powdered pitch binder were mixed with 50 parts of beryllium carbide powder and added to the graphite flour in the mix-muller and the mixing was continued for 15 minutes at about 160° C. The mix was cooled to room temperature, crushed and passed through a micro-pulverizer. The pulverized material was cold pressed in a 5 inch diameter mold at room temperature and 5,000 p.s.i. The resulting piece was heated in an oven for 18 hours at 110° C. Then the material was re-charged to the mold, which had been heated to 112° C., and hot pressed at 1,500 p.s.i. The piece was then baked for 9 days to a temperature of about 1,000° C., following normal or conventional baking practices.

*Example 13*

Example 12 was repeated but the baking step was followed by graphitizing over a period of 48 hours to a final temperature of 2,000° C., following normal or conventional electrode graphitizing practices.

The percentages of beryllium metal and of total carbon in the final products of Examples 12 or 13 were about 25.3% and 74.7% respectively.

*Example 14*

Forty (40) parts by weight of graphite flour were charged to a pre-heated mix-muller and heated for about 20 minutes at 160° C. Thirty (30) parts by weight of powdered pitch binder were mixed with 60 parts of beryllium carbide powder and added to the graphite flour in the mix-muller and the mixing was continued for 15 minutes at about 160° C. The mix was cooled to room temperature, crushed, and passed through a micro-pulverizer. The pulverized material was cold pressed in a 5 inch diameter mold at room temperature and 5,000 p.s.i. The resulting piece was heated in an oven for 18 hours at 110° C. Then the material was re-charged to the mold, which had been heated to 112° C., and hot pressed at 1,500 p.s.i. The piece was then baked for 9 days to a temperature of about 1,000° C., following normal or conventional baking practices.

*Example 15*

Example 14 was repeated but the baking step was followed by graphitizing over a period of 48 hours to a final temperature of 2,000° C., following normal or conventional electrode graphitizing practices.

The percentages of beryllium metal and of total carbon in the final products of Examples 14 or 15 were about 30.5% and 69.5% respectively.

At the mixing stage all materials should be free from any impurities detrimental to the nuclear reactor process.

By using the processes outlined above it is possible to produce economically and efficiency a highly uniform distribution of beryllium throughout the final carbon or graphite structures, which structures are suitable for use as neutron reflectors in atomic reactors.

These novel processes also permit the production of beryllium containing carbon or graphite articles of varying degrees of hardness depending on a number of factors, such as the shape specified, the forming pressures employed, etc. Also controllable is the ratio of carbon or graphite to beryllium as well as the carbon or graphite apparent density.

The process is adaptable to continuous or batchwise operations of mixing, baking, and graphitizing.

This application is a continuation-in-part of my previous application, Serial No. 657,010, filed May 6, 1957, abandoned April 6, 1962, for "Neutron Reflectors," and of my previous application, Serial No. 657,011, filed May 6, 1957, abandoned April 17, 1962, for "Neutron Reflectors for Nuclear Reactors."

Having thus described and exemplified my invention but intending to be limiting only by the scope of the appended claim.

I claim:

1. A process for producing an essentially graphitic body suitable for use as a neutron reflector material in atomic reactors in which at least a few tenths of one percent of a beryllium compound is uniformly dispersed in the graphitic body which comprises mix-mulling raw petroleum coke particles and a hydrocarbon plasticizing agent and a minor amount of beryllium compound, cooling the resultant mixture, milling the cooled mixture, forming a compact body from said mixture, and then baking and graphitizing the formed body.

2. A process for producing an essentially graphitic body suitable for use as a neutron reflector material in atomic reactors in which at least a few tenths of one percent of a beryllium compound is uniformly dispersed in the graphitic body which comprises mix-mulling raw petroleum coke particles with a minor amount of beryllium compound, adding a hydrocarbon plasticizing agent thereto and mixing and cooling the resultant mixture, milling the cooled mixture, forming a compact body from said mixture, and then baking and graphitizing the resultant product.

3. A process for producing an essentially carbon body suitable for use as a neutron reflector material in atomic reactors in which at least a few tenths of one percent of beryllium is uniformly dispersed in the carbon body which comprises mix-mulling raw petroleum coke particles and a hydrocarbon plasticizing agent and a material selected from the group consisting of beryllium metal and beryllium compounds, cooling the resultant mixture, milling the cooled mixture, forming a compact body from said mixture, and then baking the formed body.

4. The process of claim 1 wherein the beryllium compound is beryllium oxide.

5. The process of claim 1 wherein the plasticizing agent in anthracene oil.

6. The process of claim 2 wherein the beryllium compound is beryllium oxide.

7. The process of claim 2 wherein the plasticizing agent is anthracene oil.

8. A process for producing an essentially carbon body suitable for use as a neutron reflector material in atomic reactors in which at least a few tenths of one percent of beryllium is uniformly dispersed in the carbon body which comprises mix-mulling a carbon aggregate consisting essentially of calcined petroleum coke with a carbonizable binder and a material selected from the group consisting of beryllium metal and beryllium compounds, cooling the mixture and milling same, forming a compact body from said mixture, and baking the resultant product.

9. A process according to claim 8 wherein the material containing beryllium is beryllium metal.

10. A process according to claim 8 wherein the material containing beryllium is a beryllium compound.

11. A process for producing an essentially graphitic body suitable for use as a neutron reflector material in atomic reactors in which at least a few tenths of one percent of a beryllium compound is uniformly dispersed in the graphitic body which comprises mix-mulling a carbon aggregate consisting essentially of calcined petroleum coke with a carbonizable binder and a material selected from the group consisting of beryllium metal and beryllium compounds, cooling the mixture and milling same, forming a compact body from said mixture, and baking and graphitizing the resultant product.

12. A process for producing an essentially graphitic body suitable for use as a neutron reflector material in atomic reactors in which at least a few tenths of one percent of beryllium is uniformly dispersed in the graphitic body which comprises mix-mulling a carbonaceous aggregate consisting essentially of purified graphite flour with a carbonizable binder and a material selected from the group consisting of beryllium metal and beryllium compounds, cooling the mixture and milling same, forming a compact body from said mixture, and baking the resultant product.

13. A process for producing an essentially graphitic body suitable for use as a neutron reflector material in atomic reactors in which at least a few tenths of one percent of a beryllium compound is uniformly dispersed in the graphitic body which comprises mix-mulling a carbonaceous aggregate consisting essentially of purified graphite flour with a carbonizable binder and a material selected from the group consisting of beryllium metal and beryllium compounds, cooling the mixture and milling same, forming a compact body from said mixture, and baking and graphitizing the resultant product.

14. A neutron reflector suitable for use in atomic reactors comprising a predominantly carbon, formed body in which a minor quantity and at least a few tenths of one percent of beryllium is uniformly dispersed in the carbon matrix, said beryllium being bonded in the carbon body by a lattice of carbon formed by the thermal decomposition of a carbanaceous binder.

15. A neutron reflector suitable for use in atomic reactors comprising a predominantly carbon, formed body in which a minor quantity and at least a few tenths of one percent of beryllium is uniformly dispersed in the carbon matrix, said beryllium having been incorporated into the raw materials from which the formed carbon body is made prior to its formation and said beryllium being bonded in the carbon body by a carbanaceous bond which develops by a baking operation carried out on the body after it has been formed.

16. A neutron reflector suitable for use in atomic reactors comprising a predominantly graphitic, formed body in which a minor quantity and at least a few tenths of one percent of beryllium is uniformly dispersed in the graphite matrix, said beryllium being bonded in the graphitic body by a lattice of carbon formed by the thermal decomposition of a carbonaceous binder.

17. A neutron reflector suitable for use in atomic reactors comprising a predominantly graphitic, formed body in which a minor quantity and at least a few tenths of one percent of beryllium in the form of beryllium carbide is uniformly dispersed in the graphite matrix, said beryllium having been incorporated into the raw materials from which the formed graphite body is made prior to its formation and said beryllium being bonded in the graphitic body by a carbonaceous bond which develops by baking and graphitizing operations carried out on the body after it has been formed.

References Cited by the Examiner

UNITED STATES PATENTS

| | | | |
|---|---|---|---|
| 2,331,479 | 10/43 | Krellner. | |
| 2,818,605 | 1/58 | Miller | 252—478 |
| 2,987,488 | 6/61 | Clark | 252—478 |
| 2,988,522 | 6/61 | Smith et al. | 252—478 |
| 3,005,761 | 10/61 | Dijck. | |

CARL D. QUARFORTH, *Primary Examiner.*

OSCAR R. VERTIZ, RUEBEN EPSTEIN, *Examiners.*